(12) United States Patent
Osawa

(10) Patent No.: US 12,456,401 B2
(45) Date of Patent: Oct. 28, 2025

(54) DISPLAY DEVICE AND CONTROL METHOD

(71) Applicant: CANON KABUSHIKI KAISHA, Tokyo (JP)

(72) Inventor: Kazuharu Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/643,108

(22) Filed: Apr. 23, 2024

(65) Prior Publication Data
US 2024/0379032 A1 Nov. 14, 2024

(30) Foreign Application Priority Data
May 12, 2023 (JP) .................................. 2023-079335

(51) Int. Cl.
G09G 3/00 (2006.01)
G02B 27/00 (2006.01)
G02B 27/01 (2006.01)

(52) U.S. Cl.
CPC ......... G09G 3/003 (2013.01); G02B 27/0093 (2013.01); G02B 27/0172 (2013.01); G02B 27/0176 (2013.01); G02B 2027/0138 (2013.01); G02B 2027/0178 (2013.01); G02B 2027/0187 (2013.01)

(58) Field of Classification Search
CPC .. G09G 3/003; G02B 27/0093; G02B 27/017; G02B 27/0172; G02B 27/0176; G02B 2027/0138; G02B 2027/0178; G02B 2027/0187
See application file for complete search history.

(56) References Cited

U.S. PATENT DOCUMENTS

| | | |
|---|---|---|
| 8,335,040 B2 | 12/2012 | Mukawa |
| 11,157,078 B2 | 10/2021 | Sazuka et al. |
| 2010/0103078 A1 | 4/2010 | Mukawa |
| 2013/0069850 A1 | 3/2013 | Mukawa |
| 2022/0011998 A1* | 1/2022 | Hudman ................ G02B 7/005 |

FOREIGN PATENT DOCUMENTS

JP 2010-102077 A 5/2010

* cited by examiner

Primary Examiner — Cory A Almeida
(74) Attorney, Agent, or Firm — Venable LLP

(57) ABSTRACT

A display device includes: a display that displays an image; a camera that acquires an eyeball image obtained by capturing an image of an eyeball of a user seeing the display; a processor; and a memory storing a program which, when executed by the processor, causes the processor to request the user to perform, as a first operation, an operation of arranging the eyeball in a first range in the eyeball image, and adjust a position of a first member used for displaying the image to arrange the eyeball, which is positioned in the first range in the eyeball image, so as to be in a second range included in the first range.

20 Claims, 12 Drawing Sheets

DISPLAY DEVICE AND CONTROL METHOD

BACKGROUND OF THE INVENTION

Field of the Invention

The present invention relates to a display device and a control method.

Description of the Related Art

A head-mounted display (hereinafter called an "HMD") employs a configuration including a display unit that displays an image of a user and a head attachment mechanism that fixes the HMD to the head of the user. The display unit includes display members such as a display that displays an image and an eyepiece.

In this configuration, the HMD is fixed to the head of the user by the head attachment mechanism, and the display unit is arranged in front of the eyes of the user. The user observes the display via the eyepiece, and sees an image displayed on the display.

In such an HMD, the image quality of an image visually recognized by a user is generally degraded when a positional deviation between a display member and eyeballs of the user is large. In order to prevent the degradation of the image quality, a positional relationship between the eyeballs of the user and the display member is needed to be appropriately adjusted.

A position adjustment unit of the display member enables adjustment of a position of the display member for each HMD by adjusting a position of a head attachment mechanism with respect to the head of the user. Further, the HMD may have the attachment assist function of detecting a deviation between the display member and the eyeballs by an eyeball camera that observes the eyeballs and of indicating, to the user, adjustment of the head attachment mechanism.

However, since the head attachment mechanism has a degree of freedom in a plurality of directions, it is difficult to adjust the position of the display member with high accuracy in all the directions. Therefore, even if attachment of the head attachment mechanism is assisted by the eyeball camera, accuracy in performing adjustment of a degree of freedom in the plurality of directions is limited.

Meanwhile, Japanese Patent Application Laid-open No. 2010-102077 describes a method for adjusting a position of a display member using a plurality of adjustment units including adjustment units other than a head attachment mechanism.

SUMMARY OF THE INVENTION

The present invention makes it possible to arrange displays, lenses, or the like more appropriately and easily and simply with respect to eyeballs.

A first aspect of the present invention provides a display that displays an image; a camera that acquires an eyeball image obtained by capturing an image of an eyeball of a user seeing the display; a processor; and a memory storing a program which, when executed by the processor, causes the processor to request the user to perform, as a first operation, an operation of arranging the eyeball in a first range in the eyeball image, and adjust a position of a first member used for displaying the image to arrange the eyeball, which is positioned in the first range in the eyeball image, so as to be in a second range included in the first range.

A second aspect of the present invention provides a display device capable of manually adjusting, by a first operation of a user seeing a display, a relative position of a first member used for displaying an image with respect to an eyeball of the user, the display device comprising: the display that displays the image; a processor; and a memory storing a program which, when executed by the processor, causes the processor to 1) request the user to adjust a position of the first member by the first operation, and 2) request the user to adjust, by a second operation of the user different from the first operation after the position of the first member is adjusted by the first operation, the position of the first member in a part of a direction in which the position of the first member is adjustable by the first operation.

A third aspect of the present invention provides a control method for a display device having a display that displays an image, and a camera that acquires an eyeball image obtained by capturing an image of an eyeball of a user seeing the display, the control method comprising: requesting the user to perform, as a first operation, an operation of arranging the eyeball in a first range in the eyeball image; and adjusting a position of a first member used for displaying the image to arrange the eyeball, which is positioned in the first range in the eyeball image, so as to be in a second range included in the first range.

A fourth aspect of the present invention provides a non-transitory computer readable medium that stores a program, wherein the program causes a computer to execute a control method for a display device having a display that displays an image, and a camera that acquires an eyeball image obtained by capturing an image of an eyeball of a user seeing the display, the control method comprising: requesting the user to perform, as a first operation, an operation of arranging the eyeball in a first range in the eyeball image; and adjusting a position of a first member used for displaying the image to arrange the eyeball, which is positioned in the first range in the eyeball image, so as to be in a second range included in the first range.

Further features of the present invention will become apparent from the following description of exemplary embodiments with reference to the attached drawings.

DESCRIPTION OF THE EMBODIMENTS

Hereinafter, embodiments for carrying out the present invention will be described with reference to the drawings.

First Embodiment

Figure 1A:
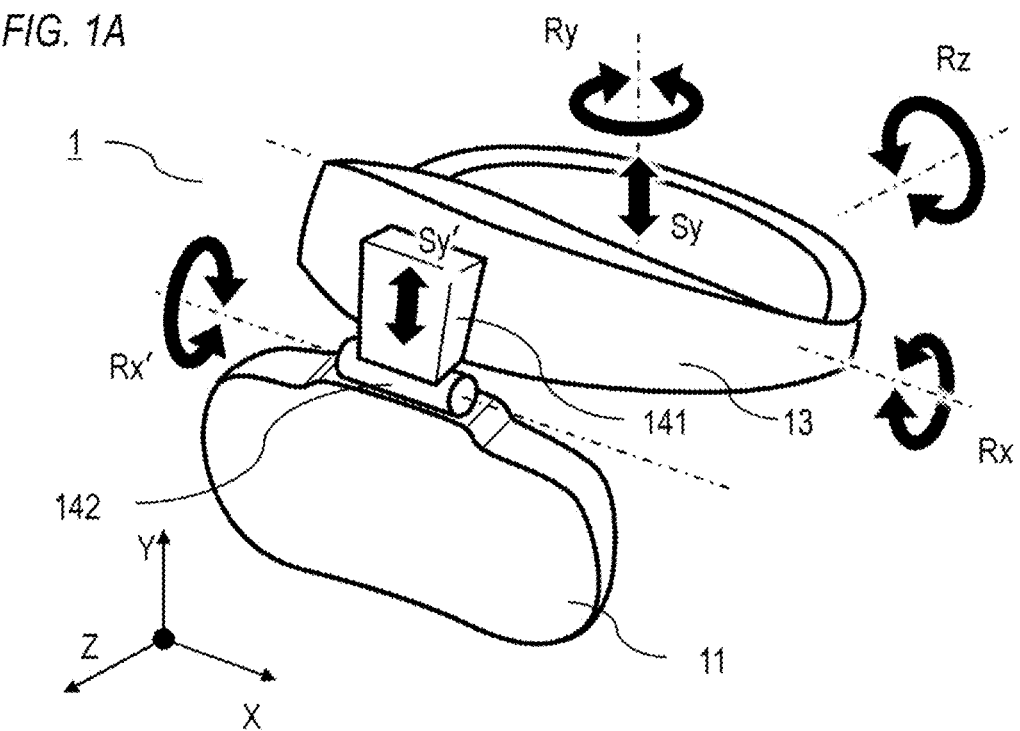
FIGS. 1A and 1B are views for describing the configuration of an HMD according to a first embodiment.
Figure 1B:
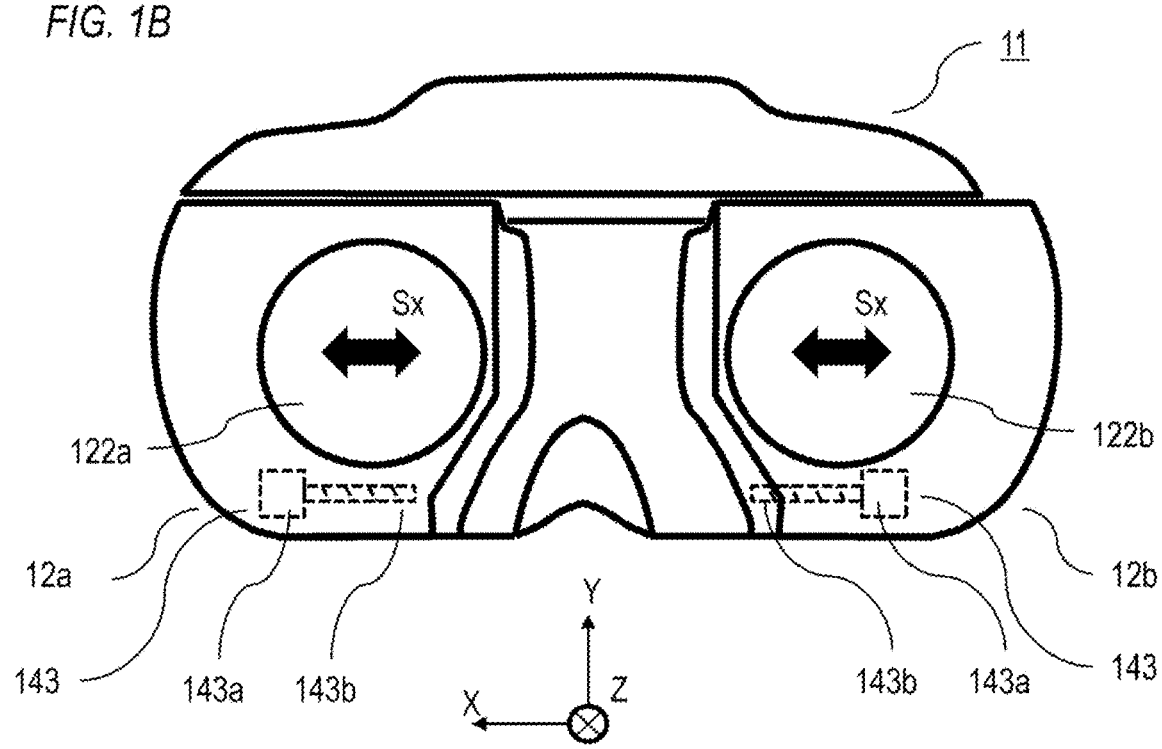
Figure 2A:
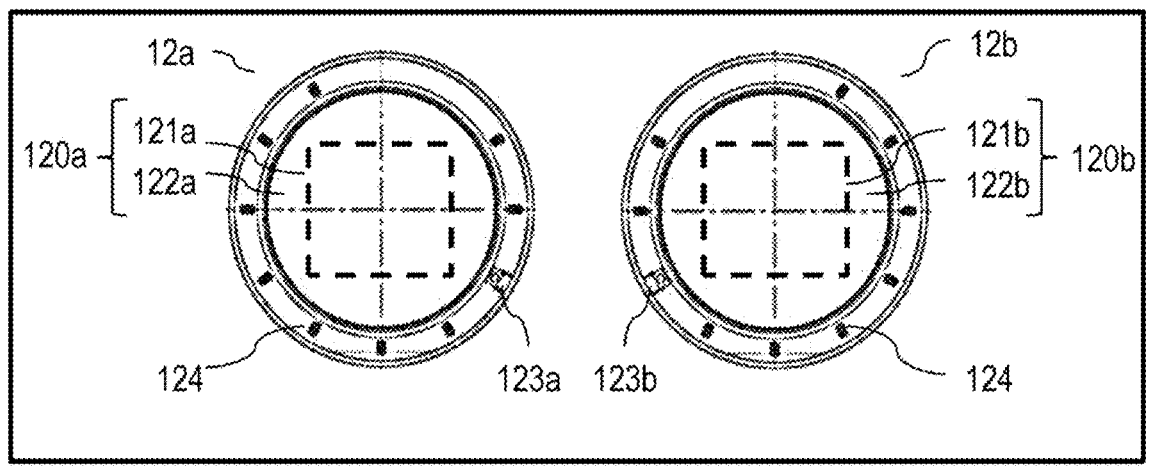
FIGS. 2A and 2B are views for describing the configuration of the HMD according to the first embodiment.
Figure 2B:
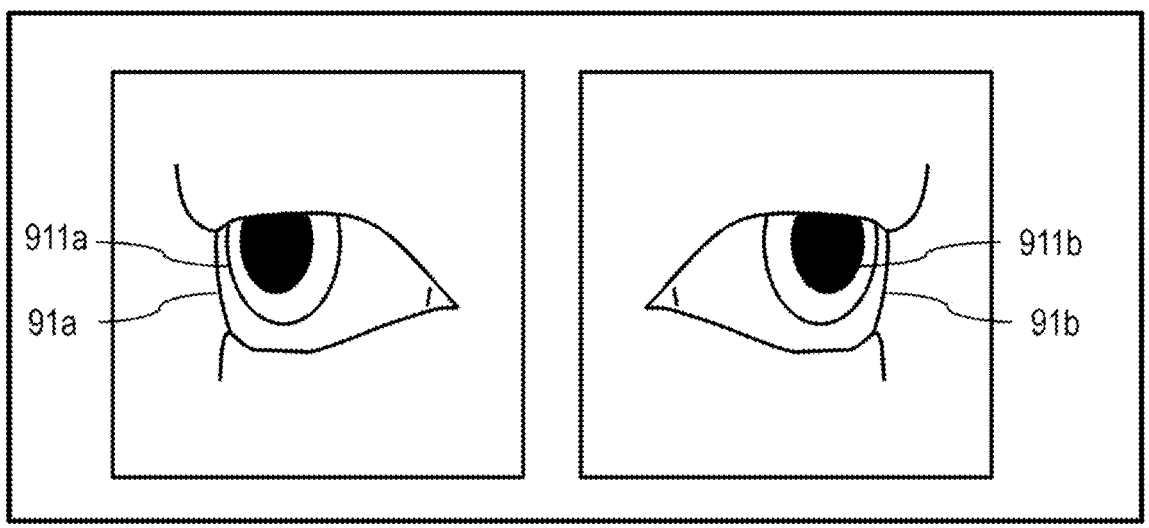

An HMD 1 according to a first embodiment will be described using FIGS. 1A, 1B, 2A, and 2B. FIG. 1A is an appearance view of the HMD 1. FIG. 1B is an appearance view of an HMD body 11 included in the HMD 1. FIG. 2A is a view showing the configuration (a display 121a, a display 121b, an eyepiece 122a, an eyepiece 122b, an eyeball camera 123a, and an eyeball camera 123b) of the HMD 1. FIG. 2B shows an image of a left eyeball 91a and an image of a right eyeball 91b.

The HMD 1 is a display device attached to the head of a user. As shown in FIG. 1A, the HMD 1 has the HMD body 11, a head attachment mechanism 13, and a plurality of coupling mechanisms (a vertical shift mechanism 141 and a tilt mechanism 142). The plurality of coupling mechanisms couple the HMD body 11 and the head attachment mechanism 13 together.

The HMD body 11 is retained by the head attachment mechanism 13 and the plurality of coupling mechanisms. The HMD body 11 is arranged in front of the eyes of the user. The head attachment mechanism 13 is a headband-like member fixed to the head of the user.

As shown in FIG. 1B, the HMD body 11 has two display units 12 that correspond to right and left eyes, respectively. The two display units 12 include a left display unit 12a (a unit that displays an image for the left eye of the user) and a right display unit 12b (a unit that displays an image for the right eye of the user).

FIG. 2A is a view showing display members included in the two display units 12. The left display unit 12a has the display 121a and the eyepiece 122a as the display members (optical members). The right display unit 12b has the display 121b and the eyepiece 122b as the display members (optical members). Hereinafter, the display 121a and the eyepiece 122a will be collectively called a "display member 120a," and the display 121b and the eyepiece 122b will be collectively called a "display member 120b."

Each of the displays 121a and 121b displays an image. The user sees images displayed on the displays 121a and 121b via the eyepieces 122a and 122b. Each of the left display unit 12a and the right display unit 12b has a plurality of IRED elements 124 that emit infrared light to the eyeballs of the user. The left display unit 12a has the eyeball camera 123a (an imaging unit) that observes an eyeball. The right display unit 12b has the eyeball camera 123b (an imaging unit) that observes an eyeball. The left display unit 12a integrally has the eyeball camera 123a and the display member 120a. Therefore, a position of the eyeball camera 123a changes with a change in a position of the display member 120a. The right display unit 12b integrally has the eyeball camera 123b and the display member 120b. Therefore, a position of the eyeball camera 123b changes with a change in a position of the display member 120b.

FIG. 2B shows an image of the eyeball 91a of the left eye of the user acquired by the eyeball camera 123a and an image of the eyeball 91b of the right eye of the user acquired by the eyeball camera 123b. The eyeball camera 123a observes a contour of a left pupil 911a and reflected light of infrared light, and acquires a two-dimensional or three-dimensional relative position of the eyeball 91a with respect to the left display unit 12a. The eyeball camera 123b observes a contour of a right pupil 911b and reflected light of infrared light, and acquires a two-dimensional or three-dimensional relative position of the eyeball 91b with respect to the right display unit 12b.

Here, adjustment units (adjustment members) of the HMD 1 will be described. The adjustment units are capable of adjusting a relative position of the display member 120a with respect to the eyeball 91a and a relative position of the display member 120b with respect to the eyeball 91b. The HMD 1 has the head attachment mechanism 13, the vertical shift mechanism 141, the tilt mechanism 142, and horizontal shift mechanisms 143 as the adjustment units. Hereinafter, a right-left direction of the user will be called an "X-direction," a front direction will be called a "Z-direction," and a direction substantially orthogonal to the X-direction and the Z-direction will be called a "Y-direction" as shown in FIGS. 1A and 1B.

The head attachment mechanism 13 has a degree of freedom in a plurality of directions when attached to the head of the user. For example, the head attachment mechanism 13 is capable of moving in the Y-direction (an Sy-direction in FIG. 1A) with respect to the HMD body 11 and rotating in rotational directions (an Rx-direction, an Rz-direction, and an Ry-direction in FIG. 1A) about the X-direction to the Z-direction. By attaching the HMD 1 to the head of the user while adjusting the head attachment mechanism 13 having a degree of freedom in the plurality of directions, it is possible to adjust a position of the HMD body 11 in the Y-direction and rotational positions of the HMD body 11 about the X-direction to the Z-direction. However, it is difficult to adjust the head attachment mechanism 13 at the same time and with high accuracy in the plurality of directions. Therefore, in order to adjust the HMD body 11 with high accuracy, the adjustment units (the adjustment units other than the head attachment mechanism 13) for separately adjusting the positions in the respective directions are additionally needed.

The vertical shift mechanism 141 is an adjustment unit that shifts the HMD body 11 in the Y-direction (an Sy'-direction in FIG. 1A) with respect to the head attachment mechanism 13 and adjusts the position of the HMD body 11 in the Y-direction.

The tilt mechanism 142 is an adjustment unit that rotates the HMD body 11 about the X-direction (an Rx'-direction in FIG. 1A) with respect to the vertical shift mechanism 141. The tilt mechanism 142 adjusts the rotational position of the HMD body 11 about the X-direction. The tilt mechanism 142 is coupled to the vertical shift mechanism 141.

The horizontal shift mechanisms 143 are adjustment units that separately (independently) move the left display unit 12a and the right display unit 12b in the X-direction (an Sx-direction in FIG. 1B) in the HMD body 11 (HMD 1). In the HMD 1, the horizontal shift mechanisms 143 are generically-termed mechanisms of rotary motors 143a, guide mechanisms not shown, or the like. According to the horizontal shift mechanisms 143, a position of the left display unit 12a in the X-direction and a position of the right display unit 12b in the X-direction are separately adjustable in the HMD body 11 (HMD 1).

The rotary motors 143a are driving units having a lead shaft 143b. The left display unit 12a engages one lead shaft 143b, and the right display unit 12b engages another lead shaft 143b. The HMD 1 rotates the lead shafts 143b by controlling the rotary motors 143a. By the rotation of the lead shafts 143b, positions of the left display unit 12a and the right display unit 12b in the X-direction are adjustable in the HMD body 11 (HMD 1).

(Relationships between Plurality of Adjustment Units) Here, relationships between the plurality of adjustment units will be described with reference to eyeball images obtained when the eyeball cameras 123a and 123b photograph the left and right eyeballs of the user, respectively.

Figure 3A:
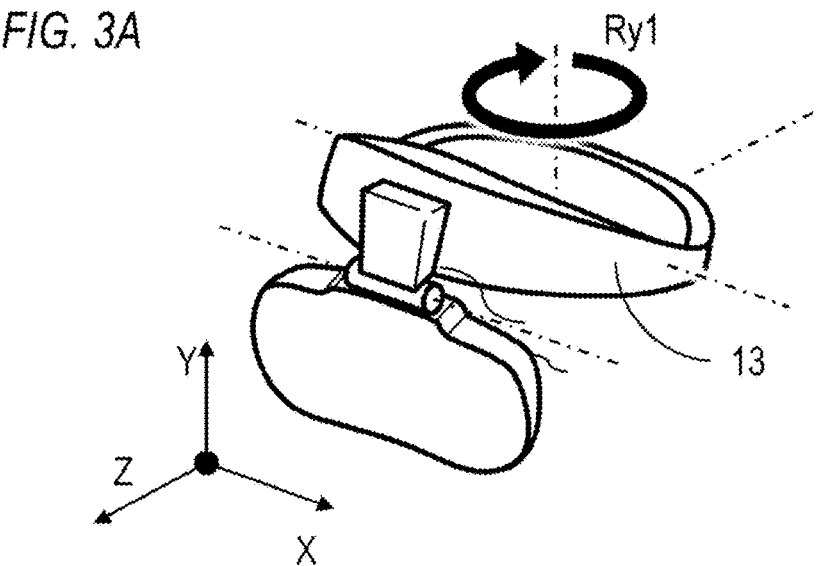
FIGS. 3A to 3C are views for describing a head attachment mechanism and horizontal shift mechanisms according to the first embodiment.
Figure 3B:
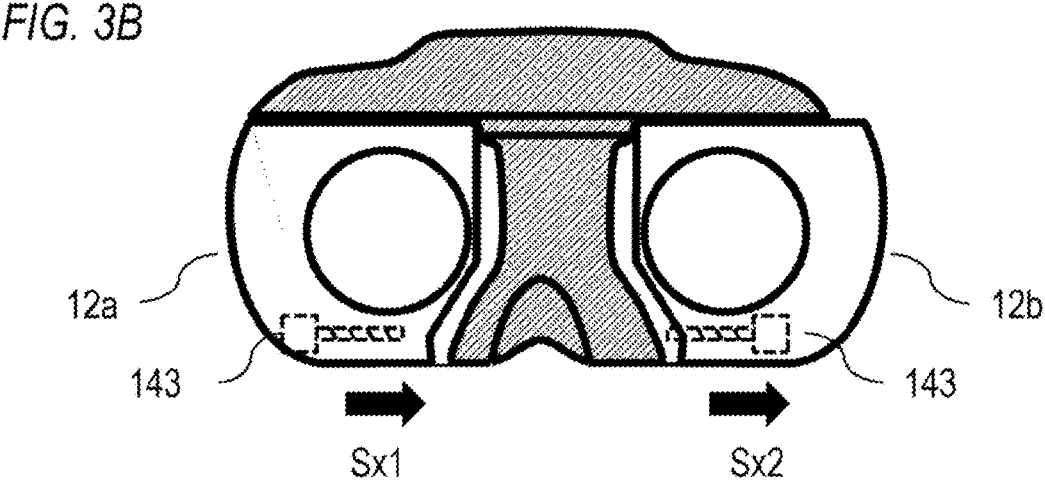
Figure 3C:
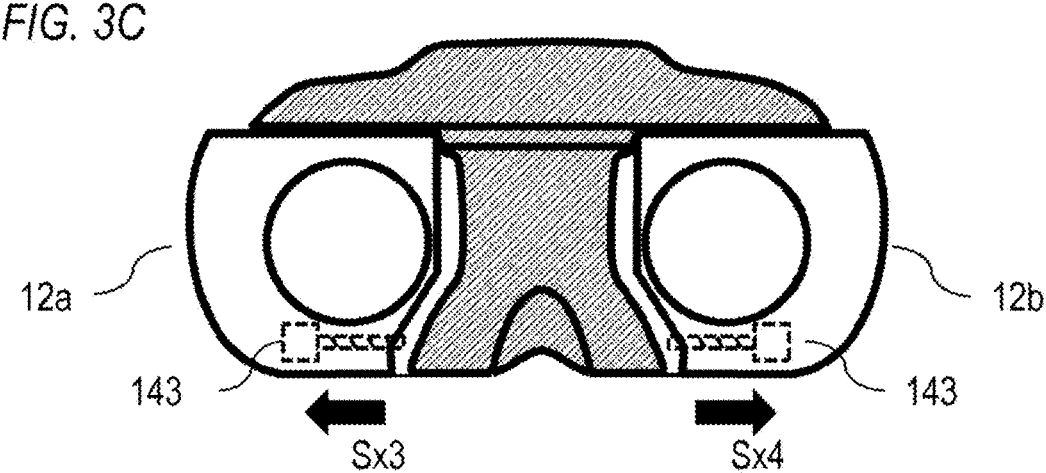
Figure 4A:
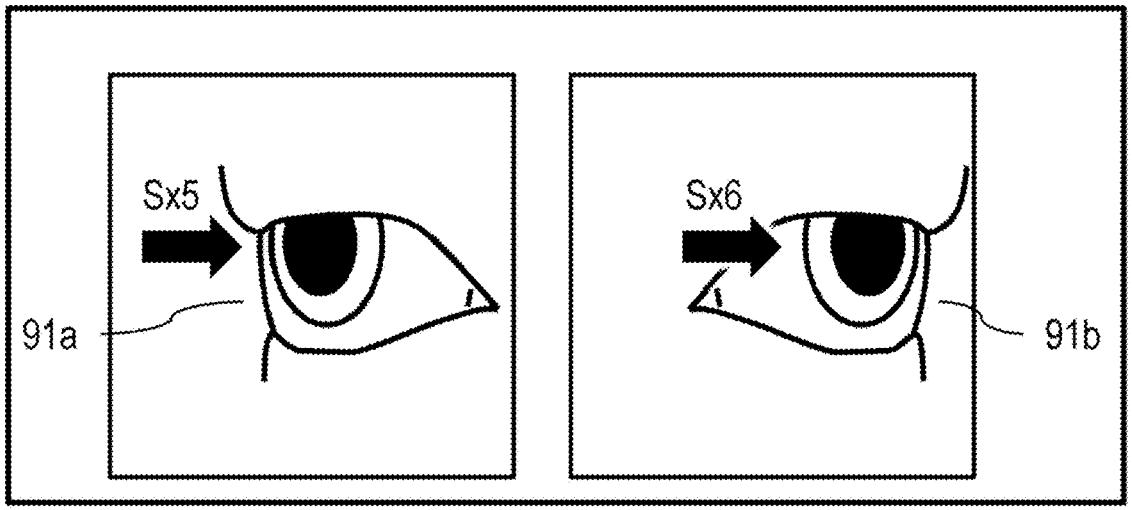
FIGS. 4A to 4C are views for describing the head attachment mechanism and the horizontal shift mechanisms according to the first embodiment.
Figure 4B:
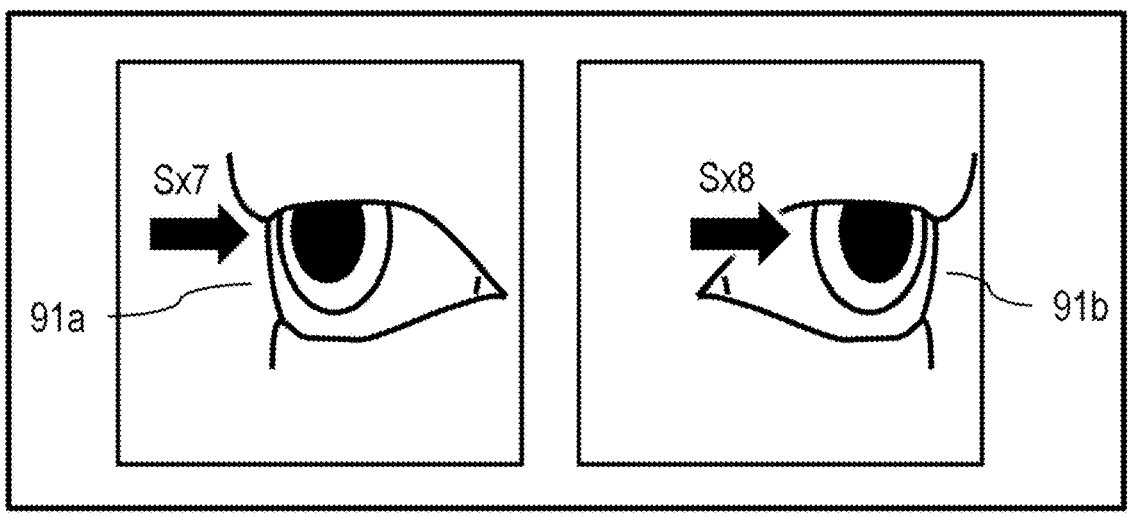
Figure 4C:
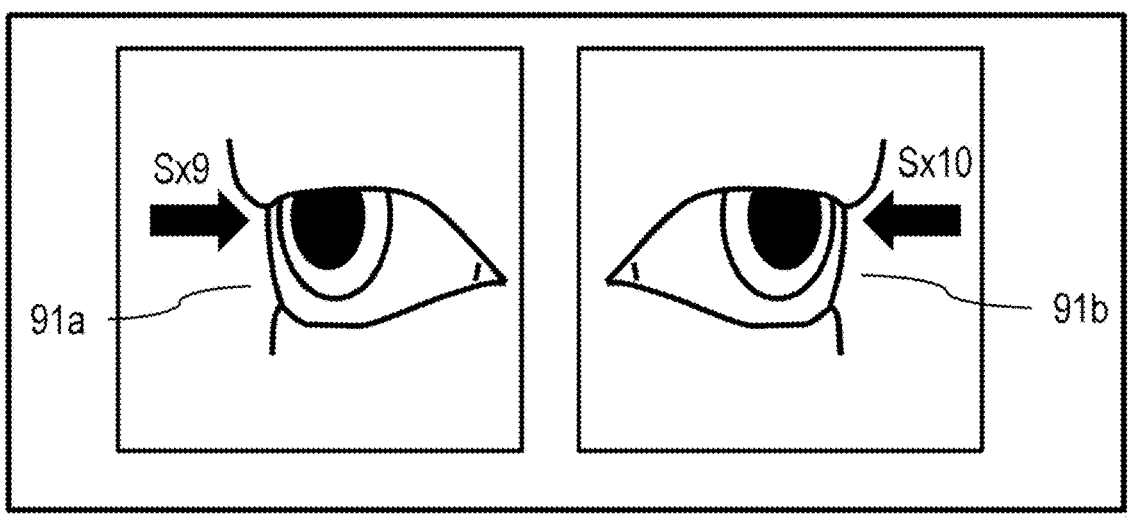

FIGS. 3A to 3C and FIGS. 4A to 4C are views for describing a relationship between the head attachment mechanism 13 and the horizontal shift mechanisms 143. FIGS. 3A to 3C are views for describing adjustment of a position of the HMD body 11 (the display members 120a and 120b) by adjustment of the head attachment mechanism 13 and the horizontal shift mechanisms 143. FIGS. 4A to 4C show eyeball images (eyeball images of the left and right eyeballs 91a and 91b) acquired by the eyeball cameras 123a and 123b. A position of the eyeball 91a in the eyeball image of the left eyeball 91a shows a relative position of the eyeball 91a with respect to the display member 120a. A position of the eyeball 91b in the eyeball image of the right eyeball 91b shows a relative position of the eyeball 91b with respect to the display member 120b.

A case where positions of the two display units 12 are adjusted about the Y-direction (an Ry1-direction in FIG. 3A) by the head attachment mechanism 13 as shown in FIG. 3A will be considered. In this case, the two display units 12 (the display members 120a and 120b) move along substantially the same vectors. Therefore, both the eyeballs 91a and 91b are enabled to move along substantially the same vectors (Sx5 and Sx6 in FIG. 4A) in the two eyeball images as shown in FIG. 4A.

A case where the positions of the two display units 12 are adjusted in the same direction (an Sx1-direction and an Sx2-direction in FIG. 3B) in the X-direction by the horizontal shift mechanisms 143 as shown in FIG. 3B will be considered. In this case, the two display units 12 (the display members 120a and 120b) move along substantially the same vectors. Therefore, the eyeballs 91a and 91b are enabled to move along substantially the same vectors (Sx7 and Sx8 in FIG. 4B) in the two eyeball images as shown in FIG. 4B.

Note that a case where the positions of the two display units 12 are adjusted in mutually opposite directions X (an Sx3-direction and an Sx4-direction in FIG. 3C) by the horizontal shift mechanisms 143 as shown in FIG. 3C will be considered. In this case, the two display units 12 (the display members 120a and 120b) move along substantially opposite to each other vectors. Therefore, the eyeballs 91a and 91b are enabled to move along substantially opposite vectors (Sx9 and Sx10 in FIG. 4C) each other in the two eyeball images as shown in FIG. 4C.

The vectors along which the eyeballs move in planes of the two eyeball images are described above. However, a light axis of the eyeball camera 123a and a light axis of the eyeball camera 123b are not necessarily parallel to each other. In view of this, in a case where the two light axes are not parallel to each other, it is appropriate to three-dimensionally calculate vectors along which the eyeballs move after generating eyeball images in which the influence of tilts of the light axes is corrected. Therefore, the vectors along which the eyeballs move have not only a component in a plane direction of the eyeball images but also a component in a depth direction thereof.

Note that in the adjustment using the horizontal shift mechanisms 143, it is possible to perform an operation of shifting the eyeballs 91a and 91b in substantially the same direction as shown in FIG. 4B and an operation of shifting the eyeballs 91a and 91b in substantially opposite directions as shown in FIG. 4C in combination. Thus, the position of each of the eyeballs 91a and 91b of the user is separately adjustable in the X-direction. For example, an interval between the eyeballs 91a and 91b is different for each user. Therefore, positional adjustment of the display members 120a and 120b is enabled so that an interval between the display members 120a and 120b corresponds to an interval between the eyeballs 91a and 91b of each user. Thus, it is possible to arrange the display members 120a and 120b at more appropriate positions.

Next, a relationship between the tilt mechanism 142 and the vertical shift mechanism 141 will be described.

Figure 5A:
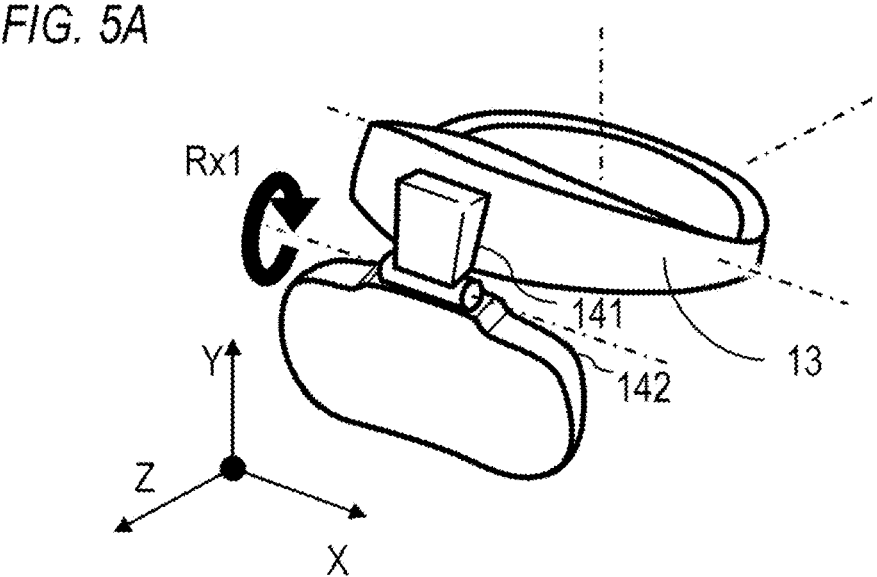
FIG. 5A is a view for describing a tilt mechanism according to the first embodiment.
Figure 5B:
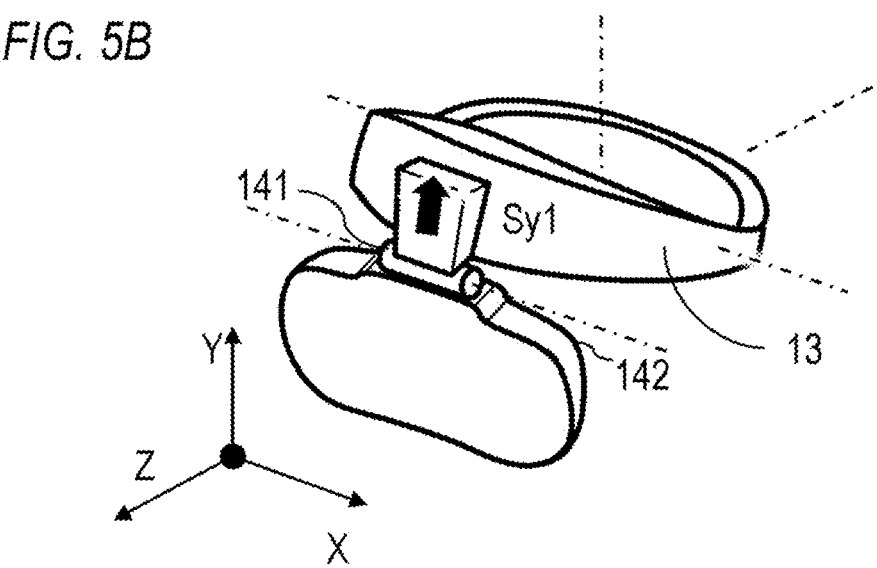
FIG. 5B is a view for describing a vertical shift mechanism according to the first embodiment.
Figure 6A:
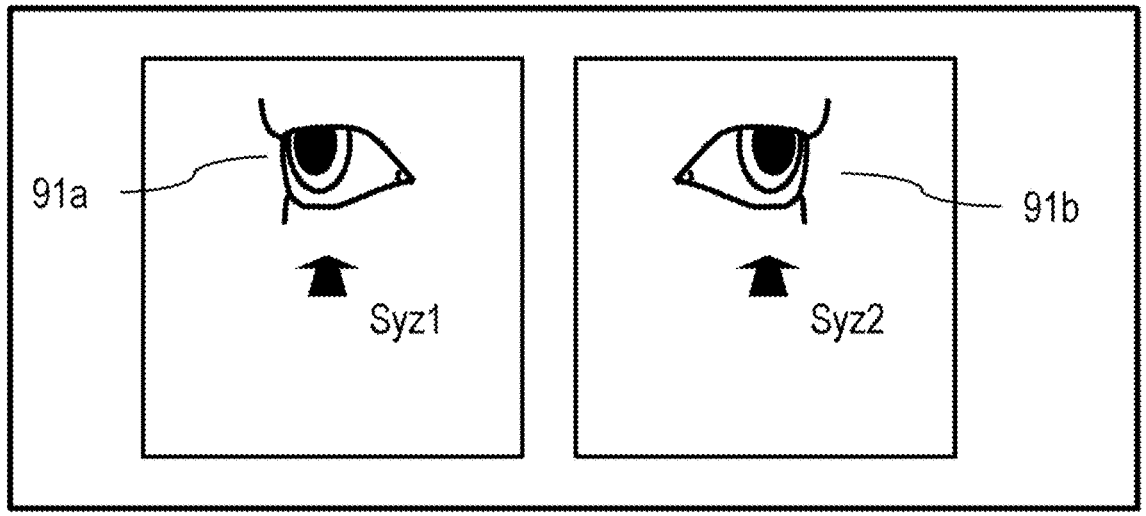
FIG. 6A is a view for describing the tilt mechanism according to the first embodiment.
Figure 6B:
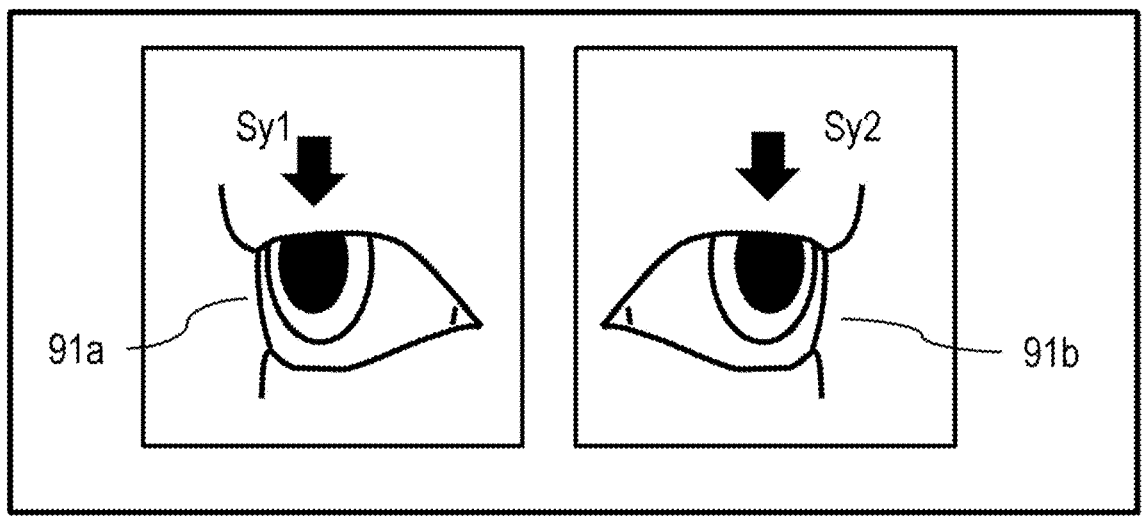
FIG. 6B is a view for describing the vertical shift mechanism according to the first embodiment.

FIGS. 5A and 5B and FIGS. 6A and 6B are views for describing the relationship between the tilt mechanism 142 and the vertical shift mechanism 141. FIGS. 5A and 5B show an adjustment example of the position of the HMD body 11 by adjustment of the tilt mechanism 142 and the vertical shift mechanism 141. FIGS. 6A and 6B are eyeball images (eyeball images of the left and right eyeballs 91a and 91b) acquired by the eyeball cameras 123a and 123b.

When the position of the HMD body 11 is adjusted about the X-direction (an Rx1-direction in FIG. 5A) by the tilt mechanism 142 as shown in FIG. 5A, both the eyeballs 91a and 91b are enabled to move along substantially the same vectors (Syz1 and Syz2 in FIG. 6A) as shown in FIG. 6A. By the adjustment of the tilt mechanism 142, it is possible to realize "shifting of the eyeballs 91a and 91b in the Y-direction and shifting of the eyeballs 91a and 91b in the Z-direction" at the same time.

Further, when the position of the HMD body 11 is adjusted in the Y-direction (an Sy1-direction in FIG. 5B) by the vertical shift mechanism 141 as shown in FIG. 5B, both the eyeballs 91a and 91b are enabled to move along substantially the same vectors (Sy1 and Sy2 in FIG. 6B) as shown in FIG. 6B. By the adjustment of the vertical shift mechanism 141, it is possible to shift the eyeballs 91a and 91b in the Y-direction.

(Positional Adjustment of Display Members) Next, entire processing of the positional adjustment of the display members 120a and 120b will be described with reference to the flowchart of FIG. 7A. Hereinafter, processing to perform the positional adjustment of the display members 120a and 120b by adjustment of the respective adjustment units will be described. Hereinafter, processing of respective steps is performed when a control unit (such as a processor) included in the HMD 1 runs a program.

In step S1002, the control unit performs control to cause a user to adjust the head attachment mechanism 13. In step S1003, the control unit performs control to cause the user to adjust the tilt mechanism 142. In step S1004, the control unit performs control to cause the user to adjust the vertical shift mechanism 141. In step S1005, the control unit adjusts the horizontal shift mechanisms 143.

Figure 7A:
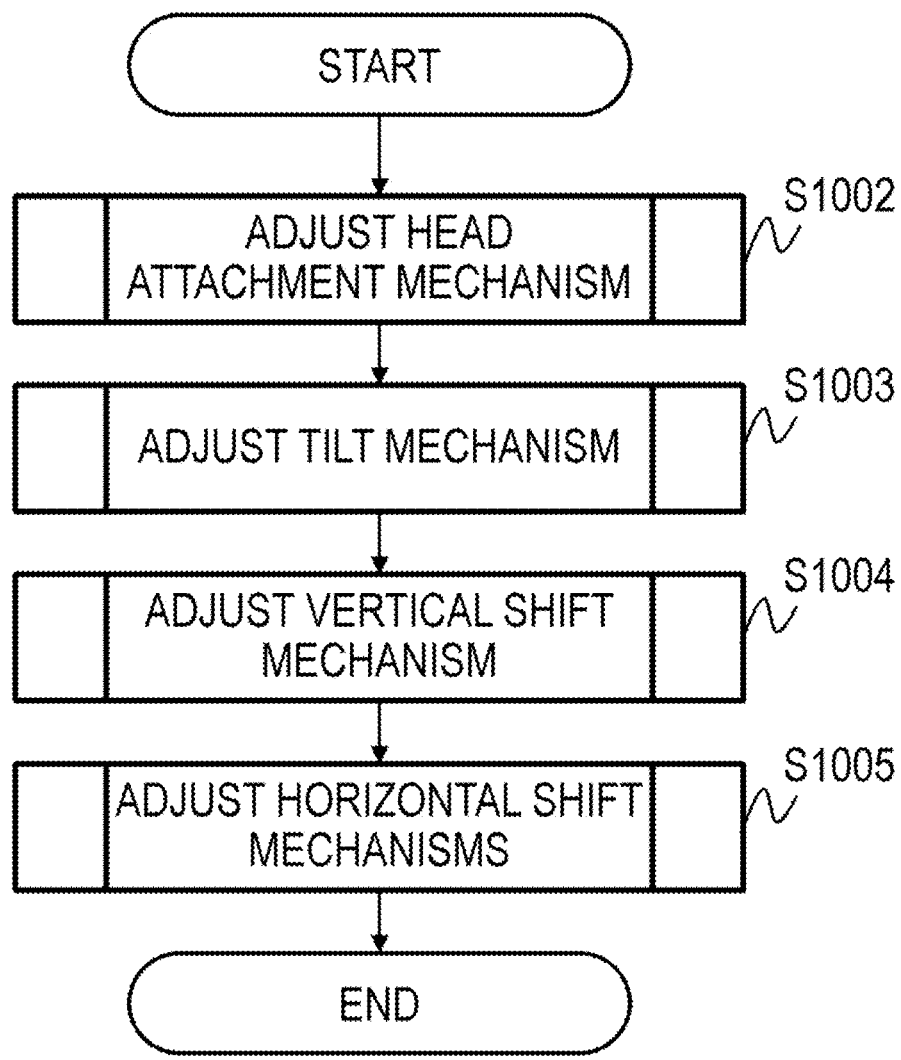
FIGS. 7A to 7C are flowcharts of adjustment of positions of display members according to the first embodiment.

In the flowchart of FIG. 7A, each of the adjustment units is adjusted as being manually operated by the user in steps S1002 to S1004.

On the other hand, the HMD 1 drives the rotary motors 143a included in the horizontal shift mechanisms 143 to automatically adjust the horizontal shift mechanisms 143 in step S1005. As described above, the head attachment mechanism 13, the tilt mechanism 142, and the vertical shift mechanism 141 are adjustment units (hereinafter called "manual adjustment units") that are manually adjusted by an operation of the user. The horizontal shift mechanisms 143 are adjustment units (hereinafter called "automatic adjustment units") that are automatically adjustable regardless of an operation of the user.

(Adjustment Processing of Head Attachment Mechanism) The adjustment of the head attachment mechanism 13 in step S1002 will be described with reference to the flowchart of FIG. 7B.

In step S1008, the control unit determines whether the adjustment of the head attachment mechanism 13 is needed. When the respective positions of the eyeballs 91a and 91b have fallen within target ranges in two eyeball images, it is determined in step S1008 that the adjustment of the head attachment mechanism 13 is not needed. When it is determined that the adjustment of the head attachment mechanism 13 is not needed, the processing of this flowchart ends. When it is determined that the adjustment of the head attachment mechanism 13 is needed, the processing proceeds to step S1009.

Figure 9:
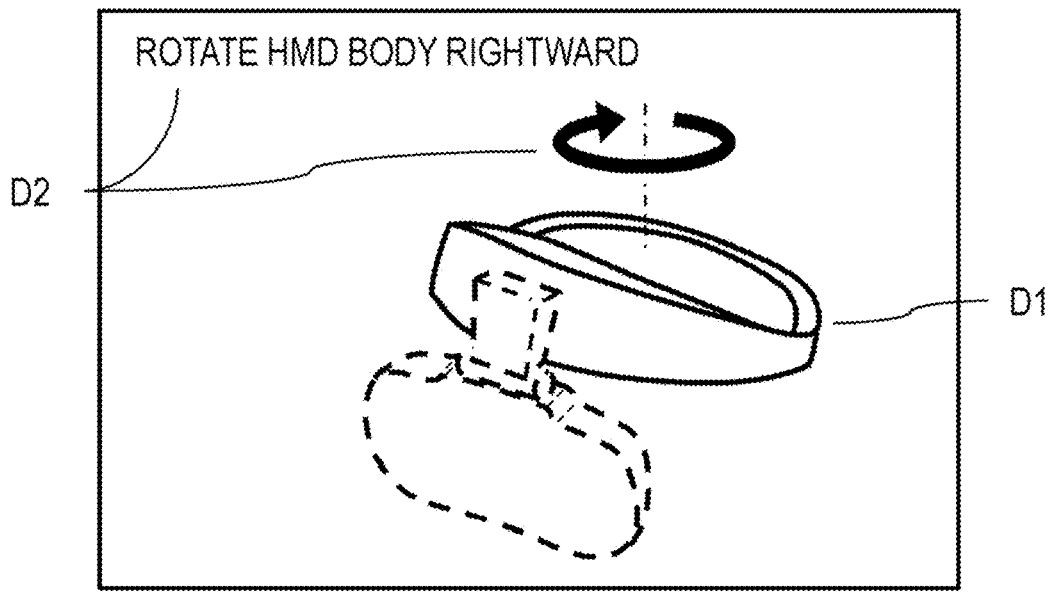
FIG. 9 is a view showing an adjustment indication image according to the first embodiment.

In step S1009, the control unit requests the user to perform the adjustment of the head attachment mechanism 13 (perform an operation to adjust the head attachment mechanism 13). At this time, the control unit displays an adjustment indication image for requesting the user to perform the adjustment on the displays 121a and 121b. FIG. 9 shows an example of the adjustment indication image. The adjustment indication image includes an indication D1 representing an adjustment unit needed to be adjusted (the indication D1 of the adjustment unit), an indication D2 representing an adjustment direction of the adjustment unit (the indication D2 of the indication direction), or the like. A highlighted image of the head attachment mechanism 13 is, for example, displayed as the indication D1 of the adjustment unit. Further, an arrow or a character string representing the adjustment direction of the head attachment mechanism 13 is displayed as the indication D2 of the adjustment direction.

Here, if such adjustment indications are not displayed, the user is not enabled to grasp the adjustment unit and the adjustment direction needed to be adjusted. Therefore, the display of the indications in step S1009 may reduce a possibility that the adjustment is performed in a wrong order and reduce a possibility that the adjustment becomes complicated. Note that only any one of the indication of the adjustment unit and the indication of the adjustment direction may be displayed.

In step S1010, the control unit determines whether the respective eyeballs 91a and 91b have been arranged in the target ranges in the two eyeball images after the adjustment of the head attachment mechanism 13 by the user. Then, when it is determined that the eyeballs 91a and 91b have been arranged in the target ranges, the control unit determines that the display members 120a and 120b have been appropriately arranged and determines that the adjustment of the head attachment mechanism 13 has been completed. When it is determined that the adjustment of the head attachment mechanism 13 has been completed, the processing proceeds to step S1011. When it is determined that the adjustment of the head attachment mechanism 13 has not been completed (when it is determined that at least one of the eyeballs 91a and 91b has not been arranged in the target range), the processing returns to step S1009. In this case, the processing of steps S1009 and S1010 is repeatedly performed until the adjustment of the head attachment mechanism 13 is completed.

In step S1011, the control unit displays an image (adjustment complete image) representing the completion of the adjustment of the head attachment mechanism 13 on the displays 121a and 121b.

Figure 7B:
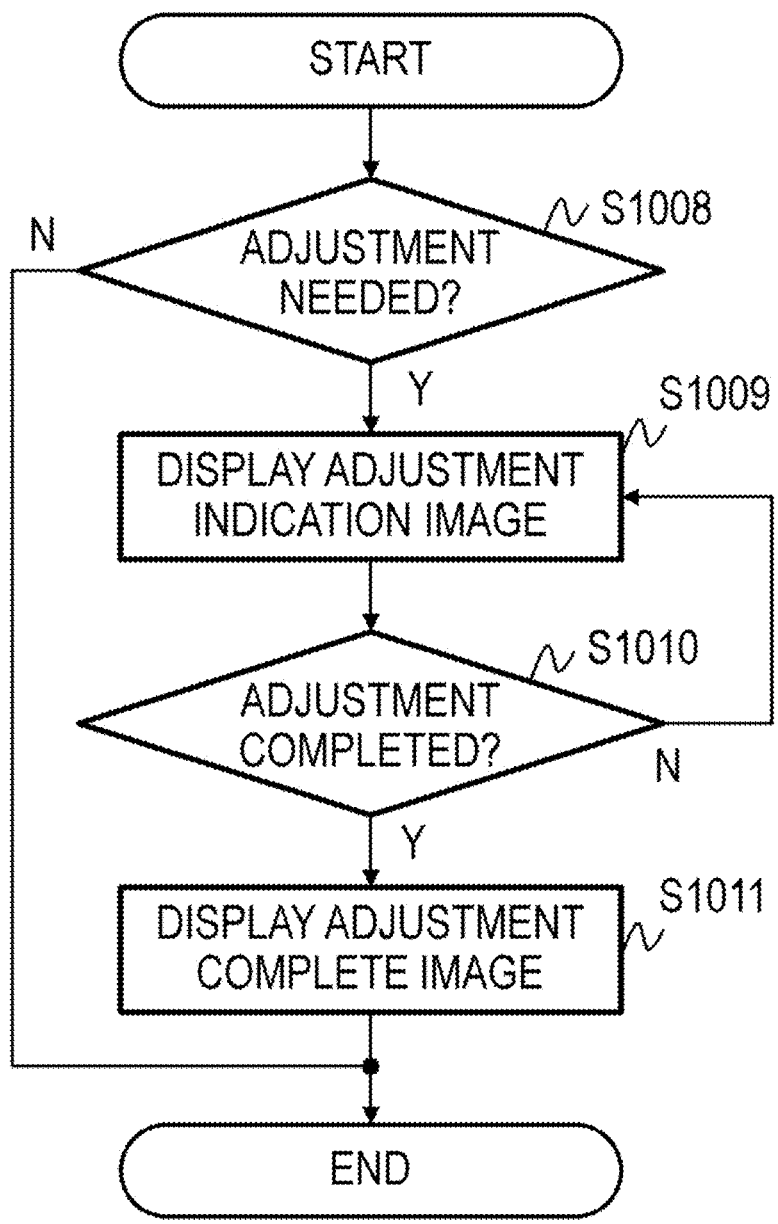

As for details about the adjustment of the "tilt mechanism 142" in step S1003 and the adjustment of the "vertical shift mechanism 141" in step S1004, "adjustment units" as processing targets are different in the flowchart shown in FIG. 7B but other points are the same. Therefore, detailed descriptions of the processing of steps S1003 and S1004 will be omitted.

(Adjustment Processing of Horizontal Shift Mechanisms) Subsequently, the adjustment of the horizontal shift mechanisms 143 in step S1005 will be described with reference to the flowchart of FIG. 7C. Note that the processing of the flowchart of FIG. 7C may start, for example, when the control unit determines that "manual adjustment of an adjustment unit has been performed in at least any of steps S1002 to S1004." That is, the processing of the flowchart of FIG. 7C may start when a relative position of the display member 120a with respect to the eyeball 91a or a relative position of the display member 120b with respect to the eyeball 91b has been manually adjusted by an operation of the user.

In step S1014, the control unit determines whether the adjustment of the horizontal shift mechanisms 143 is needed. When the eyeballs 91a and 91b have been arranged in target ranges in two eyeball images, the control unit determines in step S1014 that the adjustment of the horizontal shift mechanisms 143 is not needed. When at least any of the eyeballs 91a and 91b has not been arranged in a target range in the two eyeball images, the control unit determines that the adjustment of the horizontal shift mechanisms 143 is needed. When it is determined that the adjustment of the horizontal shift mechanisms 143 is not needed, the processing proceeds to step S1017. When it is determined that the adjustment of the horizontal shift mechanisms 143 is needed, the processing proceeds to step S1015.

In step S1015, the control unit adjusts the positions of the display members 120a and 120b so that the eyeballs 91a and 91b are arranged in the target ranges in the two eyeball images. At this time, the control unit adjusts the positions of the display members 120a and 120b in the HMD body 11 (HMD 1) by driving the rotary motors 143a.

In step S1016, the control unit determines whether the automatic adjustment of the horizontal shift mechanisms 143 has been completed by determining whether the eyeballs 91a and 91b have been arranged in the target ranges in the two eyeball images. When the eyeballs 91a and 91b have been arranged in the target ranges in the two eyeball images, the control unit determines that the automatic adjustment of the horizontal shift mechanisms 143 has been completed. When it is determined that the adjustment of the horizontal shift mechanisms 143 has been completed, the processing proceeds to step S1017. When it is determined that the adjustment of the horizontal shift mechanisms 143 has not been completed, the processing returns to step S1015.

In step S1017, the control unit displays an image (selective image) for causing the user to select whether to perform manual adjustment of the horizontal shift mechanisms 143 on the displays 121a and 121b.

In step S1018, the control unit determines whether the user has selected the manual adjustment of the horizontal shift mechanisms 143. When it is determined that the user has not selected the manual adjustment, the processing of this flowchart ends. When it is determined that the user has selected the manual adjustment, the processing proceeds to step S1019.

In step S1019, the control unit displays an image for indicating the adjustment of the horizontal shift mechanisms 143 like step S1009 (see FIG. 9).

In step S1020, the control unit determines whether the adjustment of the horizontal shift mechanisms 143 has been completed. In step S1020, the control unit determines that the manual adjustment of the horizontal shift mechanisms 143 has been completed, for example, when the user has pressed an adjustment complete button. When it is determined that the adjustment has not been completed, the processing returns to step S1019. When it is determined that the adjustment has been completed, the processing of this flowchart ends.

Figure 7C:
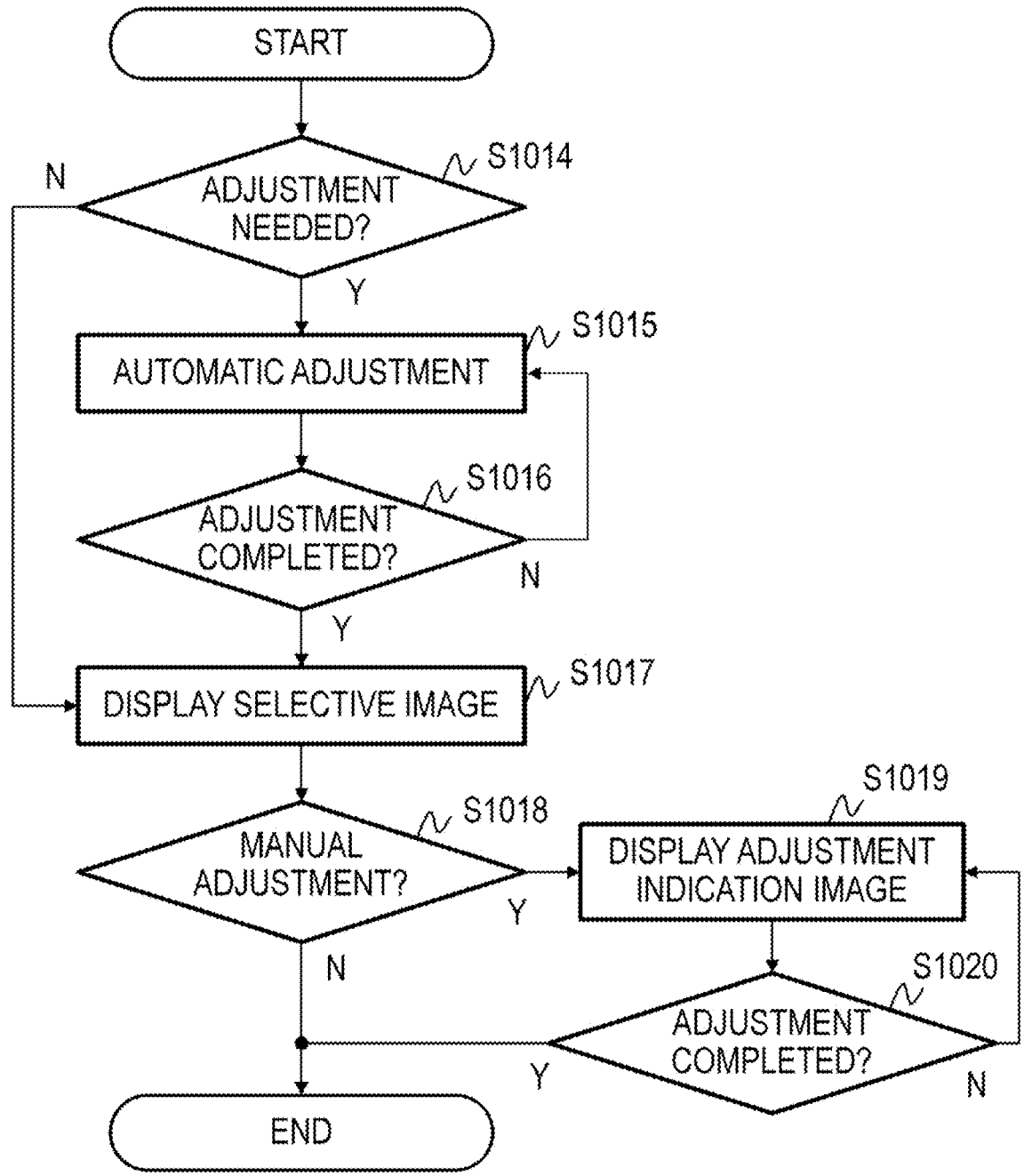

In the flowchart of FIG. 7C, the control unit performs the adjustment of the horizontal shift mechanisms 143 that are automatic adjustment units (step S1015), and determines whether the eyeballs 91a and 91b have been arranged in the target ranges in the two eyeball images (step S1016). After it is determined that the eyeballs 91a and 91b have been arranged in the target ranges, the control unit displays the selective image for causing the user to select whether to perform the manual adjustment (step S1017). Then, when the user has selected the manual adjustment in step S1018, the user performs the additional manual adjustment (step S1019).

Thus, after the automatic adjustment of the display members 120a and 120b, the user is enabled to arrange the display members 120a and 120b at positions at which display image quality is enhanced while actually seeing a display image.

Note that the HMD 1 displays the selective image for causing the user to select whether to perform the manual adjustment in step S1017. However, when it is determined in step S1016 that the eyeballs 91a and 91b have been arranged in the target ranges in the two eyeball images, the processing of steps S1017 and S1018 may not be performed. In this case, the HMD 1 may display an indication screen for manual adjustment to indicate the manual adjustment to the user in S1019.

Note that the processing of steps S1017 to S1020 for causing the user to perform the manual adjustment is performed after the automatic adjustment in steps S1015 and S1016 in the HMD 1, but the processing of steps S1017 to S1020 may not be performed.

Here, operations as in the following items (1) and (2) are realized in the HMD 1 according to the first embodiment.

(1) First adjustment is performed by a first adjustment unit, and then second adjustment is performed by a second adjustment unit. For example, as shown in FIG. 7A, the positions of the display members 120a and 120b are adjusted as the first adjustment is performed by the first adjustment unit in step S1002 in the HMD 1. Then, the positions of the display members 120a and 120b are further adjusted as the second adjustment is performed by the second adjustment unit in step S1005.

(2) In the first adjustment, a first operation of moving the positions of the eyeballs 91a and 91b along substantially the same vectors in two eyeball images is, for example, enabled by the first adjustment unit. In the second adjustment, a second operation of moving the positions of the eyeballs 91a and 91b like the first operation in the two eyeball images is, for example, enabled by the second adjustment unit. Note that the first operation here is an operation of moving the positions of the eyeballs 91a and 91b along substantially the same vectors but may be an operation of moving the positions of the eyeballs 91a and 91b along substantially opposite vectors. Note that the second operation here is the same operation as the first operation but may be an operation at least partially the same as the first operation. Further, the second operation may be an operation in which "an operation at least partially the same as the first operation" and "other operations" are combined together.

(First Case) Effects by the operations and the configurations as in the above items (1) and (2) will be described using FIGS. 8A and 8B. First, a case (first case) where the first adjustment unit corresponds to the head attachment mechanism 13 and the second adjustment unit corresponds to the horizontal shift mechanisms 143 will be described. In this case, the first adjustment unit includes a manual adjustment unit, and the second adjustment unit includes an automatic adjustment unit.

Figure 8A:
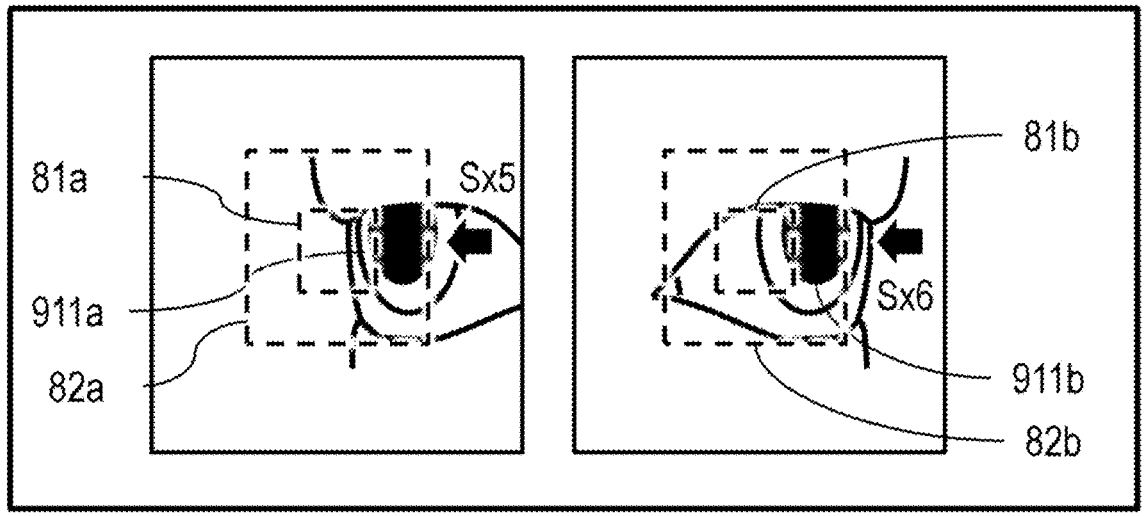
FIGS. 8A and 8B are views for describing the adjustment of the positions of the display members according to the first embodiment.
Figure 8B:
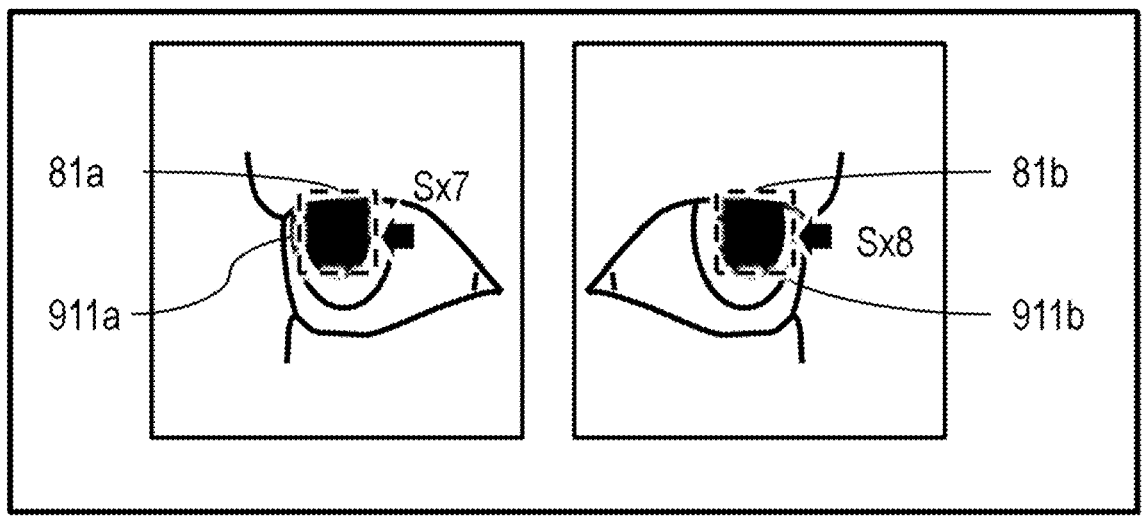

FIG. 8A shows two eyeball images obtained when the first adjustment is performed by the head attachment mechanism 13. FIG. 8B shows two eyeball images obtained when the second adjustment is performed by the horizontal shift mechanisms 143.

A target range 81a is a range in which the pupil 911a (eyeball 91a) is needed to be arranged so that the user sees a screen of the display 121a with substantial image quality. A target range 81b is a range in which the pupil 911b (eyeball 91b) is needed to be arranged so that the user sees a screen of the display 121b with substantial image quality. A position and a size of the target range 81a in a left eyeball image are the same as those of the target range 81b in a right eyeball image.

The head attachment mechanism 13 is a manual adjustment unit. Further, the target ranges 81a and 81b are relatively small in size. Therefore, if the pupils 911a and 911b are arranged in the target ranges 81a and 81b, respectively, only by the adjustment of the head attachment mechanism 13 (movement along vectors Sx5 and Sx6 in FIG. 8A), the user is needed to perform a delicate operation. As a result, a long adjustment time is needed.

In the HMD 1, movement of the positions of the eyeballs 91a and 91b in the two eyeball images is enabled by any of the adjustment of the head attachment mechanism 13 and the adjustment of the horizontal shift mechanisms 143. Therefore, even in a case where an error after the adjustment of the head attachment mechanism 13 (a difference between a position of the target range 81a and a position of the pupil 911a or a difference between a position of the target range 81b and a position of the pupil 911b) is large, it is possible to correct the error by the adjustment of the horizontal shift mechanisms 143 later.

Accordingly, in the adjustment of the head attachment mechanism 13, a range in which the pupil 911a is needed to be arranged may be a target range 82a that includes the target range 81a and is wider than the target range 81a. A range in which the pupil 911b is needed to be arranged may be a target range 82b that includes the target range 81b and is wider than the target range 81b. In this case, the control unit requests the user to perform the adjustment of the head attachment mechanism 13 (an operation to the head attachment mechanism 13) to arrange the pupils 911a and 911b in the target ranges 82a and 82b, respectively, in step S1009.

Then, the pupils 911a and 911b may be arranged in the target ranges 81a and 81b, respectively, in the adjustment of the horizontal shift mechanisms 143. In this case, the control unit performs the adjustment of the horizontal shift mechanisms 143 to arrange the pupils 911a and 911b in the target ranges 81a and 81b, respectively, in step S1015.

Thus, the pupils 911a and 911b may only be arranged in the large ranges (the target ranges 82a and 82b), respectively, in manual adjustment of the head attachment mechanism 13. Therefore, it is possible to simply and easily perform the manual adjustment. In addition, automatic adjustment is performed in the subsequent adjustment of the horizontal shift mechanisms 143. Therefore, even in a case where the pupils 911a and 911b are arranged in the small ranges (the target ranges 81a and 81b), respectively, it is possible to easily realize the automatic adjustment.

(Second Case) Next, a case (second case) where the first adjustment unit corresponds to the head attachment mechanism 13 will be assumed.

The head attachment mechanism 13 has a degree of freedom in a plurality of directions with respect to the head, and has a difficulty in controlling the positions of the display members 120a and 120b with high accuracy in comparison with other adjustment units. Therefore, when the pupils 911a and 911b are arranged in the target ranges 81a and 81b, respectively, a particularly long adjustment time is needed in the adjustment of the head attachment mechanism 13 only.

In view of this, the pupils 911a and the 911b are arranged in the wide target ranges 82a and 82b, respectively, in the adjustment of the head attachment mechanism 13 that needs a particularly long time in the HMD 1. Then, the pupils 911a and 911b are arranged in the target ranges 81a and 81b, respectively, in adjustment of adjustment units (adjustment units having fewer directions in which the positions of the display members 120a and 120b are movable than the head attachment mechanism 13) other than the head attachment mechanism 13. Therefore, the control unit requests the user to perform the adjustment of the adjustment units (perform an operation to the adjustment units) to arrange the pupils 911a and 911b in the target ranges 81a and 81b, respectively.

As described above, the adjustment of the head attachment mechanism 13 that has a difficulty in controlling the positions of the display members 120a and 120b with high accuracy is first performed, and then the adjustment of other adjustment units is performed. Thus, the positions of the display members 120a and 120b are made controllable with low accuracy but in a short period of time by the head attachment mechanism 13 having a high degree of freedom, and are made adjustable with high accuracy by other adjustment units later. Accordingly, it is possible for the user to adjust the positions of the display members 120a and 120b easily and promptly.

(Third Case) Further, a case (third case) where the first adjustment unit corresponds to the tilt mechanism 142 and the second adjustment unit corresponds to the vertical shift mechanism 141 in adjustment of the positions of the display members 120a and 120b in the Y-direction will be described.

In this case, the tilt mechanism 142 that corresponds to the first adjustment unit is an adjustment mechanism (hereinafter called a "rotation adjustment mechanism") capable of adjusting the positions of the display members 120a and 120b by rotating the HMD body 11. The vertical shift mechanism 141 that corresponds to the second adjustment unit is a mechanism capable of adjusting the positions of the display members 120a and 120b by shifting the HMD body 11.

When the positions of the display members 120a and 120b are adjusted by the rotation adjustment mechanism like the tilt mechanism 142, the pupils 911a and 911b shift (move) in the Y-direction and the Z-direction as shown in FIG. 6A. The rotation adjustment mechanism is unable to perform separate adjustment in both directions (the Y-direction and the Z-direction), and therefore has a difficulty in controlling the respective positions in the Y-direction and the Z-direction at the same time and with high accuracy. Therefore, a long adjustment time is needed when the positions of the pupils 911a and 911b are controlled in the Y-direction and the Z-direction with high accuracy.

In the HMD 1, the positions of the pupils 911a and 911b may be controlled with high accuracy only in the Z-direction by the adjustment of the tilt mechanism 142 that corresponds to the rotation adjustment mechanism. Then, the positions of the pupils 911a and 911b may be controlled with high accuracy in the Y-direction by adjustment of the vertical shift mechanism 141. As described above, the adjustment of the positions of the display members 120a and 120b using the rotation adjustment mechanism is also realizable simply and easily.

In the HMD 1 according to the first embodiment, it is possible to control the positions of the display members 120a and 120b simply and easily and with high accuracy.

Note that the first to the third cases are described above but a combination of the first adjustment unit and the second adjustment unit is not limited to the combination of the adjustment units described above.

Note that the HMD 1 has the display member 120a (the display 121a and the eyepiece 122a) and the display member 120b (the display 121b and the eyepiece 122b). Further, the eyeball camera 123a provides an eyeball image showing a relative position of the left eyeball 91a with respect to the display member 120a as shown in FIG. 2B. The eyeball camera 123b provides an eyeball image showing a relative position of the right eyeball 91b with respect to the display member 120b as shown in FIG. 2B. Thus, accurate measurement of "the relative position of the display member 120a with respect to the eyeball 91a" and "the relative position of the display member 120b with respect to the eyeball 91b" is enabled. Accordingly, it is possible to control the positions of the display members 120a and 120b with higher accuracy.

Note that the eyeball camera 123a is integrated with the display 121a and the eyepiece 122a in the HMD 1. The eyeball camera 123b is integrated with the display 121b and the eyepiece 122b. Thus, for example, "a relative position between the eyeball camera 123a and the eyeball 91a" is recognizable as "a relative position between the display member 120a and the eyeball 91a." Therefore, the positions of the eyeballs 91a and 91b are detectable with high accuracy by simple calculation. Then, an improvement in the detection accuracy of the positions of the eyeballs 91a and 91b enable control of the positions of the display members 120a and 120b with higher accuracy.

Note that the first embodiment describes an example in which both positions of the display members 120a and 120b are adjusted at the same time, but only any one of the positions may be adjusted. Alternatively, the other position may be adjusted after only any one of the positions of the display members 120a and 120b is adjusted. Further, it is described that a case where the position of the display member 120a is adjusted is a case where both positions of the display 121a and the eyepiece 122a are adjusted, but any one of the positions of the display 121a and the eyepiece 122a may be adjusted. Similarly, any one of the positions of the display 121b and the eyepiece 122b may be adjusted when the position of the display member 120b is adjusted.

(Modified Example) Note that the HMD 1 according to the first embodiment uses the target ranges 82a and 82b when performing the adjustment of the first adjustment unit in a first case where the first adjustment unit corresponds to the head attachment mechanism 13 and the second adjustment unit corresponds to the horizontal shift mechanisms 143. Further, the HMD 1 uses the target ranges 81a and 81b when performing the adjustment of the second adjustment unit. Since strokes (adjustable amounts) at which the positions of the display members 120a and 120b are adjustable are limited, there is a case that the strokes become insufficient in the adjustment of the second adjustment unit. In this case, the HMD 1 is unable to arrange the eyeballs 91a and 91b in the target ranges 81a and 81b, respectively. Therefore, there is a possibility that the HMD 1 is unable to arrange the display members 120a and 120b at appropriate positions.

In order to avoid this problem, the HMD 1 corrects the target ranges 82a and 82b on the basis of "positions of the eyeballs 91a and 91b in two eyeball images" and "stroke ranges at which the second adjustment unit is enabled to move the display members 120a and 120b." At this time, the target range 82a is corrected (determined) so that arrangement of the display member 120a in the target range 81a is enabled by the second adjustment unit. The target range 82b is corrected (determined) so that arrangement of the display member 120b in the target range 81b is enabled by the second adjustment unit.

Figure 10A:
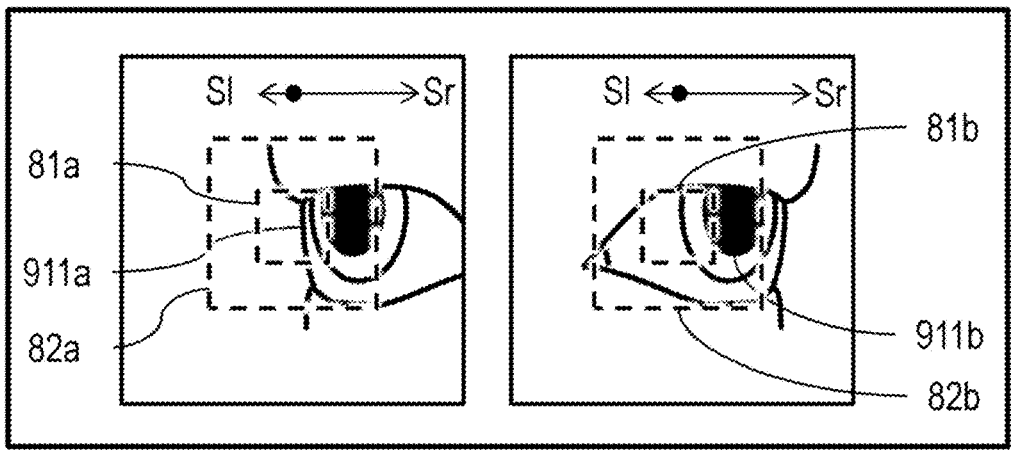
FIGS. 10A and 10B are views for describing the adjustment of the positions of the display members according to a modified example.
Figure 10B:
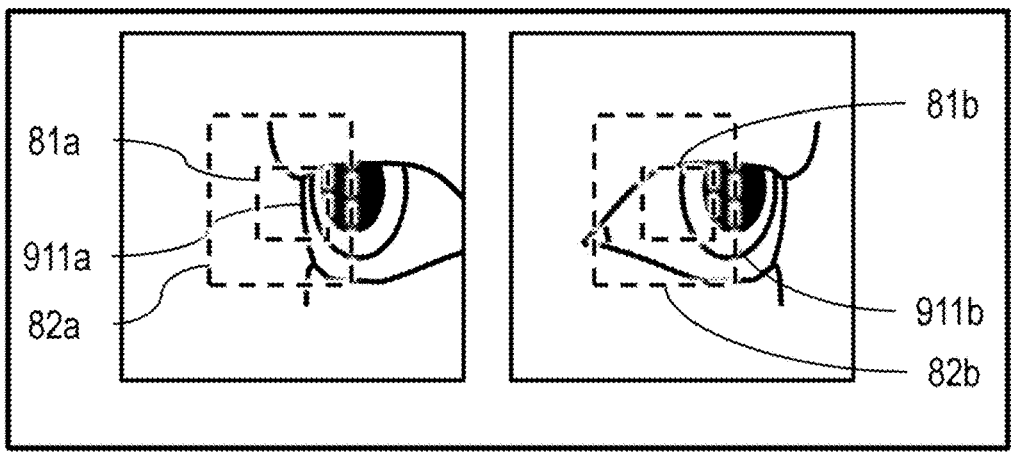

FIGS. 10A and 10B are views for describing an example in which the target ranges 82a and 82b are determined on the basis of stroke ranges at which the second adjustment unit is enabled to move the display members 120a and 120b. FIG. 10A is a view showing the target ranges 82a and 82b before correction. FIG. 10B is a view showing the target ranges 82a and 82b after the correction.

In FIG. 10A, strokes Sl and Sr are those obtained by converting strokes at which the second adjustment unit is enabled to move the display members 120a and 120b into strokes at which the eyeballs 91a and 91b are movable in eyeball images. FIG. 10A shows an example in which the stroke Sl at which the eyeballs 91a and 91b are movable leftwards is small and the stroke Sr at which the eyeballs 91a and 91b are movable rightwards is large.

When the strokes are sufficient in size, the pupils 911a and 911b may be arranged in the target ranges 82a and 82b, respectively, in the adjustment of the first adjustment unit without correction. Then, the pupils 911a and 911b are enabled to be arranged in the target ranges 81a and 81b, respectively, in the adjustment of the second adjustment unit as well.

However, when the strokes are small, there is a case that, even if the pupil 911a is arranged in the target range 82a in the adjustment of the first adjustment unit, arrangement of the pupil 911a in the target range 81a is not enabled in the subsequent adjustment of the second adjustment unit. The same applies to arrangement of the pupil 911b. In order to avoid the occurrence of such cases, the target ranges 82a and 82b are needed to be corrected as shown in FIG. 10B. In an example shown in FIG. 10B, the target ranges 82a and 82b in the adjustment of the first adjustment unit are narrowed on a right side according to a size of the stroke Sl. Thus, even if the stroke Sl in the subsequent adjustment of the second adjustment unit is small, it is possible to arrange the pupil 911a in the target range 81a.

Note that, even if the pupils 911a and 911b are arranged in the target ranges 82a and 82b, respectively, in the adjustment of the first adjustment unit, there is a possibility that positions of the pupils 911a and 911b move before the adjustment of the second adjustment unit. Therefore, there could be a case where the arrangement of the pupils 911a and 911b in the target ranges 81a and 81b is not enabled in the strokes of the second adjustment unit. In order to avoid such a case, a determination may be made as to whether "it is possible to arrange the pupils 911a and 911b in the target ranges 81a and 81b, respectively, by the adjustment of the second adjustment unit" before or during the adjustment of the second adjustment unit. Then, when it is not possible to arrange the pupil 911a in the target range 81a or when it is not possible arrange the pupil 911b in the target range 81b due to insufficient strokes, the adjustment of the second adjustment unit is interrupted, and processing returns to the adjustment of the first adjustment unit. Thus, the case where the arrangement of the pupils 911a and 911b in the target ranges 81a and 81b is not enabled is avoidable.

As described above, the control unit determines whether arrangement of eyeballs in target ranges is enabled by the second adjustment unit before or during the adjustment of the second adjustment unit. When the arrangement of the eyeballs in the target ranges is not enabled, the control unit interrupts the adjustment of the second adjustment unit and performs the adjustment of the first adjustment unit again.

Second Embodiment

Subsequently, an HMD 2 according to a second embodiment will be described. Hereinafter, the same configurations as those of the first embodiment will be denoted by the same reference symbols, and their descriptions will be omitted in the second embodiment.

Figure 11A:
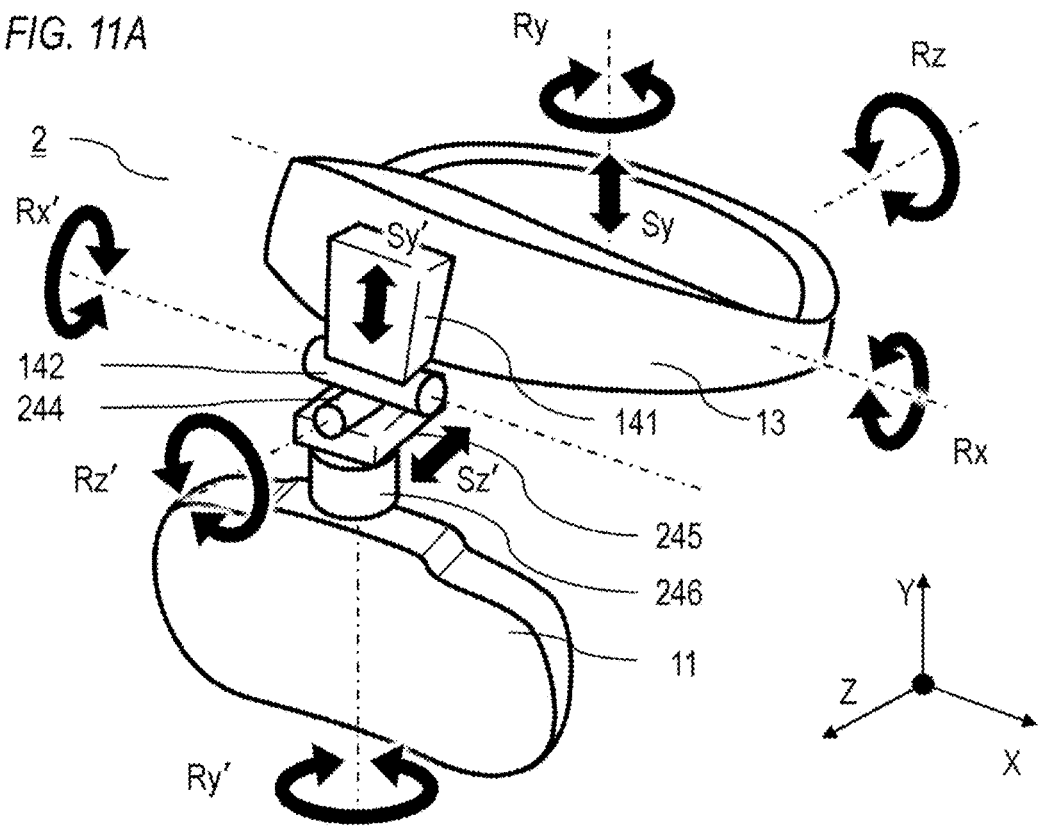
FIGS. 11A and 11B are views for describing the configuration of an HMD according to a second embodiment.
Figure 11B:
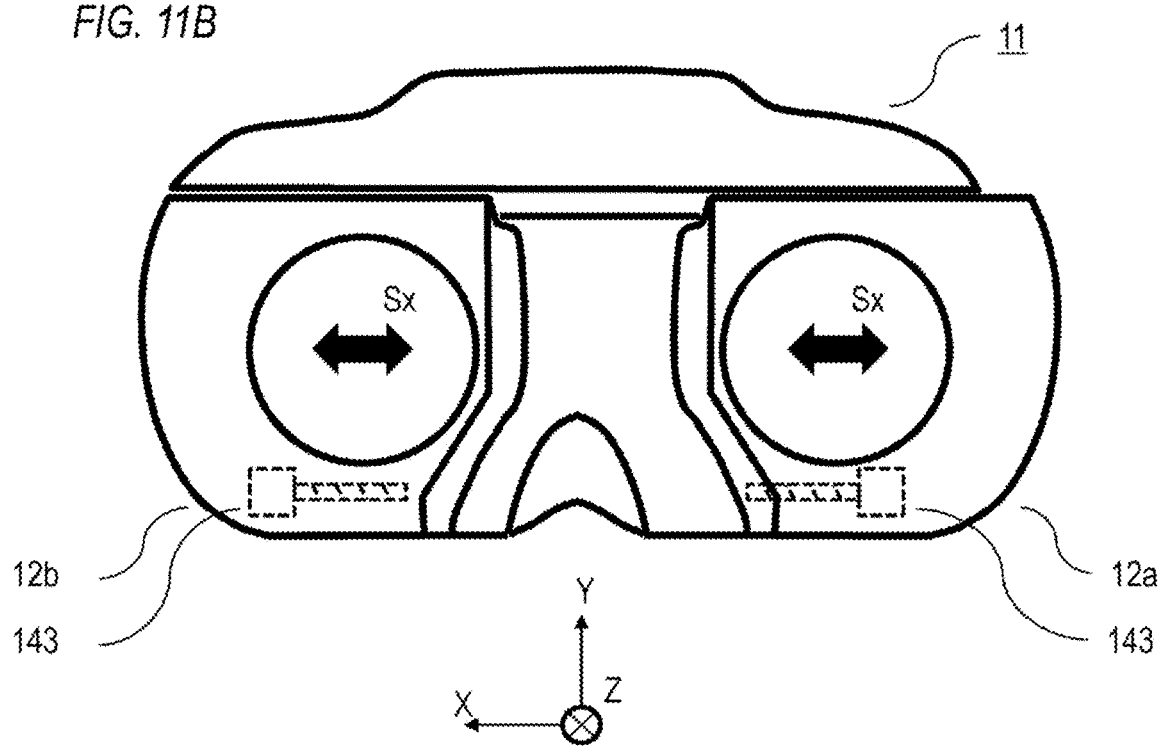

FIG. 11A is an appearance view of the HMD 2. FIG. 11B is an appearance view of an HMD body included in the HMD 2. The HMD 2 has more adjustment units in comparison with the HMD 1. As shown in FIG. 11A, the HMD 2 has an HMD body 11 and a head attachment mechanism 13. The HMD 2 has a plurality of coupling mechanisms (a vertical shift mechanism 141, a tilt mechanism 142, a roll mechanism 244, a fore-and-aft shift mechanism 245, and a yaw mechanism 246) that couple the HMD body 11 and the head attachment mechanism 13 together.

Here, the adjustment units (adjustment mechanisms) of the HMD 2 will be described. As shown in FIGS. 11A and 11B, the HMD 2 has the head attachment mechanism 13, the vertical shift mechanism 141, the tilt mechanism 142, horizontal shift mechanisms 143, the roll mechanism 244, the fore-and-aft shift mechanism 245, and the yaw mechanism 246 as the adjustment units.

The roll mechanism 244 is coupled to the tilt mechanism 142. The roll mechanism 244 is capable of rotating about a Z-direction (an Rz'-direction in FIG. 11A) with respect to the tilt mechanism 142 and adjusting a rotational position of the HMD body 11 (display members 120a and 120b) about the Z-direction.

The fore-and-aft shift mechanism 245 is coupled to the roll mechanism 244. The fore-and-aft shift mechanism 245 is capable of retaining the yaw mechanism 246 to be shiftable in the Z-direction (an Sz'-direction in FIG. 11A) and adjusting a position of the HMD body 11 (the display members 120a and 120b) in the Z-direction.

The yaw mechanism 246 is retained by the fore-and-aft shift mechanism 245. The yaw mechanism 246 is capable of retaining the HMD body 11 to be rotatable in a direction (an Ry'-direction in FIG. 11A) about a Y-direction and adjusting a position of the HMD body 11 (the display members 120a and 120b) about the Y-direction.

These adjustment units are effective for accurately controlling positions of the display members 120a and 120b.

Here, any two of the head attachment mechanism 13, the horizontal shift mechanisms 143, the vertical shift mechanism 141, the fore-and-aft shift mechanism 245, the tilt mechanism 142, the roll mechanism 244, and the yaw mechanism 246 are usable as a first adjustment unit and a second adjustment unit.

For example, a combination of "the first adjustment unit and the second adjustment unit" corresponds to a combination of "the head attachment mechanism 13 and the horizontal shift mechanisms 143," a combination of "the head attachment mechanism 13 and the vertical shift mechanism 141," or a combination of "the head attachment mechanism 13 and the roll mechanism 244." The combination of "the first adjustment unit and the second adjustment unit" corresponds to a combination of "the tilt mechanism 142 and the vertical shift mechanism 141" or a combination of "the tilt mechanism 142 and the fore-and-aft shift mechanism 245." According to such combinations, the same effects as those of the first to third cases described in the first embodiment are obtainable by the first adjustment unit and the second adjustment unit.

Note that the display members 120a and 120b include a lens (optical element) and a display (retina projection type) in the respective embodiments but are not limited to them. The display members 120a and 120b may include a laser light source and a mirror (MEMS mirror) (retina scan type). In this case, light emitted from the laser light source is reflected by the mirror and then reaches the retinas of the eyes of a user. Thus, the display members 120a and 120b draw (display) an image on the retinas of the eyes of the user. Note that any optical element having optical power (capable of changing, for example, the orbit of light) may be used instead of the mirror. For example, a prism or a diffraction optical element may be used.

Note that the head attachment mechanism 13, the tilt mechanism 142, and the vertical shift mechanism 141 are adjustment units (manual adjustment units) that are manually adjusted by an operation of a user in the respective embodiment. However, the head attachment mechanism 13, the tilt mechanism 142, and the vertical shift mechanism 141 may be automatic adjustment units that are automatically adjustable. Further, the horizontal shift mechanisms 143 are adjustment units (automatic adjustment units) that are automatically adjustable regardless of an operation of a user in the respective embodiment. However, the horizontal shift mechanisms 143 may be manual adjustment units that are manually adjusted.

The present invention is described in detail above on the basis of the preferred embodiments but is not limited to the specific embodiments. The present invention also includes various other modes without departing from its gist. Some of the embodiments described above may be appropriately combined together.

Further, in the above descriptions, "processing proceeds to step S1 when A is at least B, and proceeds to step S2 when A is smaller (lower) than B" may be read as "the processing proceeds to step S1 when A is larger (higher) than B, and proceeds to step S2 when A is not more than B." Conversely, "processing proceeds to step S1 when A is larger (higher) than B, and proceeds to step S2 when A is not more than B" may be read as "the processing proceeds to step S1 when A is at least B, and proceeds to step S2 when A is smaller (lower) than B." Therefore, "at least A" may be read as "larger (higher, longer, or greater) than A," and "not more than A" may be read as "smaller (lower, shorter, or less) than A" so long as no contradiction arises. Further, "larger (higher, longer, greater) than A" may be read as "at least A," and "smaller (lower, shorter, or less) than A" may be read as "not more than A."

Note that the respective function units of the above respective embodiments (respective modified examples) may be or may not be separate hardware. The functions of at least two function units may be realized by common hardware. Each of a plurality of functions of one function unit may be realized by separate hardware. At least two functions of one function unit may be realized by common hardware. Further, the respective function units may be or may not be realized by hardware such as ASIC, FPGA, and DSP. For example, a device may have a processor and a memory (storage medium) in which a program is stored. Further, the function of at least a part of the function units of the device may be realized when the processor reads the control program from the memory and runs the read control program.

According to the method described in Japanese Patent Application Laid-open No. 2010-102077, it is difficult for a user to understand an adjustment order and adjustment amounts of a plurality of adjustment units. As a result, there is a possibility that adjustment is complicated. Therefore, in an HMD, adjustment is complicated in appropriate arrangement of display members with respect to eyeballs of a user.

According to the present invention, it is possible to more appropriately and simply and easily arrange displays or lenses with respect to eyeballs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope f the following claims is to be accorded the broadest interpretation so as to encompass all such modifications and equivalent structures and functions.

This application claims the benefit of Japanese Patent Application No. 2023-079335, filed on May 12, 2023, which is hereby incorporated by reference herein in its entirety.

What is claimed is:

1. A display device comprising:
   a first member including a display, the display being configured to display an image;
   a camera that obtains an eyeball image by capturing an image of an eyeball of a user seeing the display;
   a processor; and
   a memory storing a program which, when executed by the processor, causes the processor to, in a case where, in response to a first operation of the user, a position of the first member, the display of which is configured to display the eyeball image, is adjusted such that the eyeball has been arranged in a first range in the eyeball image which is displayed, control is performed such that the eyeball, which is positioned in the first range in the eyeball image, is arranged in a second range included in the first range by automatically adjusting the position of the first member
   wherein the second range is a range in which a pupil of the user is needed to be arranged, and
   wherein the first range is larger than the second range.

2. The display device according to claim 1, wherein the program, when executed by the processor, further causes the processor to acquire a relative position of the eyeball with respect to the first member.

3. The display device according to claim 2, wherein the program, when executed by the processor, further causes the processor to acquire a position of the eyeball in the eyeball image as a relative position of the eyeball with respect to the first member.

4. The display device according to claim 2, wherein the program, when executed by the processor, further causes the processor to automatically adjust the position of the first member on a basis of the relative position of the eyeball with respect to the first member when a relative position of the first member with respect to the eyeball is manually adjusted by the first operation.

5. The display device according to claim 1, wherein the first range is a range based on (1) the second range and (2) an amount at which the position of the first member is adjustable.

6. The display device according to claim 1, wherein the program, when executed by the processor, further causes the processor to request, in a case where the eyeball in the eyeball image is not capable of being arranged in the second range, the user to adjust the position of the first member by the first operation again.

7. The display device according to claim 1, wherein the program, when executed by the processor, further causes the processor to display, when requesting the user to adjust the position of the first member, an indication showing at least any of a target and an adjustment direction, which require adjustment by the user.

8. The display device according to claim 1, wherein the first member includes (1) a second member that corresponds to a left eyeball of the user and (2) a third member that corresponds to a right eyeball of the user.

9. The display device according to claim 8, wherein the program, when executed by the processor, further causes the processor to adjust a position of the second member and a position of the third member so that the second member and the third member move along substantially same vectors.

10. The display device according to claim 8, wherein the program, when executed by the processor, further causes the processor to adjust a position of the second member and a position of the third member so that the second member and the third member move along vectors that are substantially opposite to each other.

11. The display device according to claim 1, wherein the program, when executed by the processor, further causes the processor to shift the first member to adjust the position of the first member.

12. The display device according to claim 1, wherein the program, when executed by the processor, further causes the processor to rotate the first member in the first operation.

13. The display device according to claim 1, wherein the first operation is adjustment of a mechanism that rotates the first member, and
   wherein the program, when executed by the processor, further causes the processor to adjust the position of the first member by a mechanism that shifts the first member.

14. The display device according to claim 1, wherein the display device is a head-mounted display attached to a head of the user.

15. The display device according to claim 14, wherein the first operation is an operation performed on a mechanism attached to the head of the user, and
   wherein the program, when executed by the processor, further causes the processor to adjust the position of the first member by a mechanism other than the mechanism attached to the head of the user.

16. The display device according to claim 1, further comprising:
   a head attachment mechanism fixed to a head of the user; and
   a coupling mechanism configured to couple the first member to the head attachment mechanism in a rotatable or shiftable manner,
   wherein the first operation is an operation carried out upon the coupling mechanism.

17. A display device capable of manually adjusting, by an operation of a user seeing a display, a relative position of a first member used for displaying an eyeball image obtained by capturing an image of an eyeball of the user with respect to the eyeball of the user, the display device comprising:
   the first member, which includes the display, the display being configured to display the eyeball image;
   a processor; and
   a memory storing a program which, when executed by the processor, causes the processor to (1) request the user to adjust a position of the first member by a first operation to arrange the eyeball so as to be in a first range in the eyeball image, and (2) request the user to adjust, by a second operation which is able to move the first member in fewer directions than the first operation after the position of the first member is adjusted by the first operation, the position of the first member to arrange the eyeball, which is positioned in the first range in the eyeball image, so as to be in a second range included in the first range,
   wherein the second range is a range in which a pupil of the user is needed to be arranged, and
   wherein the first range is larger than the second range.

18. The display device according to claim 17, further comprising a camera that is integrally constituted with the first member and that acquires the eyeball image.

19. A control method for a display device including (1) a first member including a display configured to display an image, and (2) a camera that obtains an eyeball image by capturing an image of an eyeball of a user seeing the display, the control method comprising:

in a case where, in response to a first operation of the user, a position of the first member, the display of which is configured to display the eyeball image, is adjusted such that the eyeball has been arranged in a first range in the eyeball image which is displayed, performing control such that the eyeball, which is positioned in the first range in the eyeball image, is arranged in a second range included in the first range by automatically adjusting the position of the first member, wherein the second range is a range in which a pupil of the user is needed to be arranged, and wherein the first range is larger than the second range.

20. A non-transitory computer-readable medium that stores a program, wherein the program causes a computer to execute a control method for a display device including (1) a first member including a display configured to display an image, and (2) a camera that obtains an eyeball image by capturing an image of an eyeball of a user seeing the display, the control method comprising:

in a case where, in response to a first operation of the user, a position of the first member, the display of which is configured to display the eyeball image, is adjusted such that the eyeball has been arranged in a first range in the eyeball image which is displayed, performing control such that the eyeball, which is positioned in the first range in the eyeball image, is arranged in a second range included in the first range by automatically adjusting the position of the first member, wherein the second range is a range in which a pupil of the user is needed to be arranged, and wherein the first range is larger than the second range.

* * * * *